Oct. 25, 1966   J. CHOLET   3,281,777
DEVICE FOR CORRELATING BY PAIRS THE VARIOUS
RECORD TRACES OF THE SAME SEISMIC SHOT
Filed Dec. 9, 1963
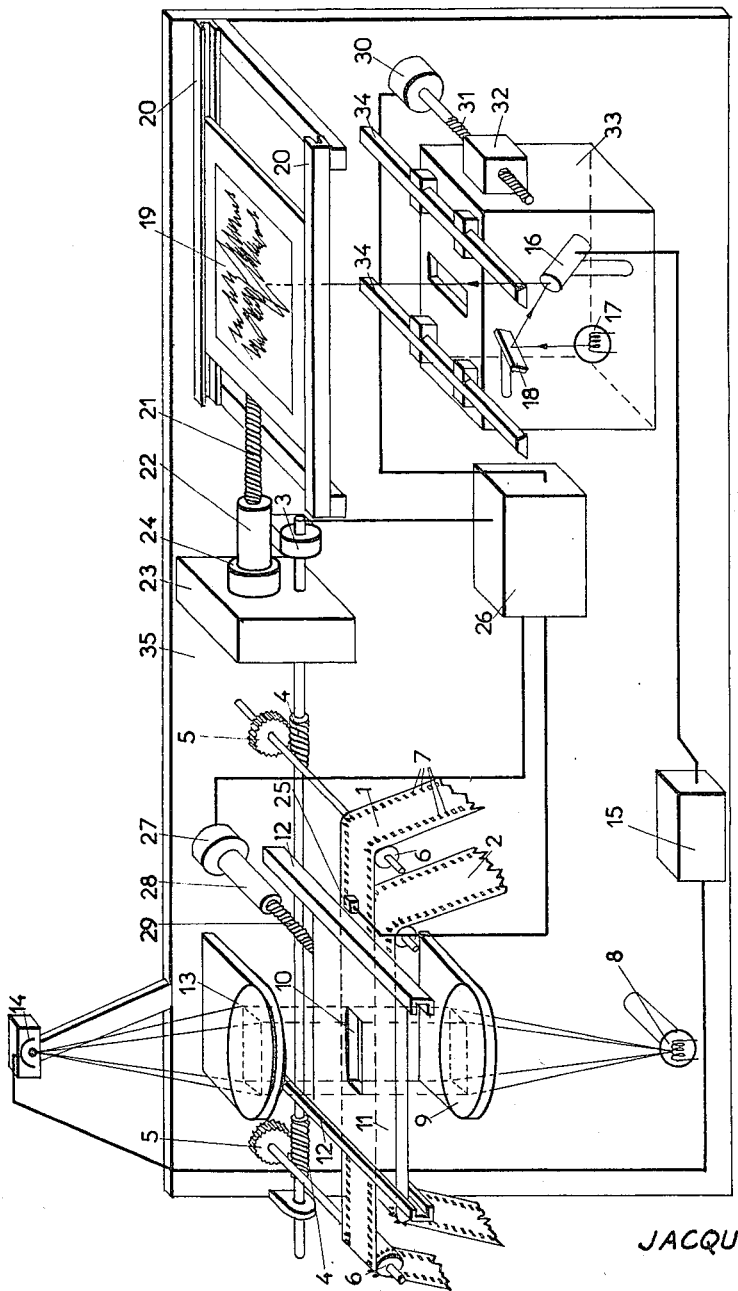
INVENTOR
JACQUES CHOLET
BY Toulmin & Toulmin
ATTORNEYS 3,281,777
DEVICE FOR CORRELATING BY PAIRS THE VARIOUS RECORD TRACES OF THE SAME SEISMIC SHOT
Jacques Cholet, Rueil-Malmaison, France, assignor to Institut Francais du Pétrole, des Carburants & Lubrifiants, Rueil-Malmaison, France
Filed Dec. 9, 1963, Ser. No. 328,844
Claims priority, application France, Dec. 11, 1962, P.V. 918,308
5 Claims. (Cl. 340—15.5)

The analytical study of a seismic record requires a series of operations comprising the correlation, which provides means for determining the time lag between the reflections on two traces of said record.

When correlating said two traces, the curve representative of the correlation function versus the time lag exhibits a peak (maximal amplitude of the correlation function) which corresponds to the time lag for which there is achieved the best coincidence between the reflections appearing on each of the correlated traces.

The $n$ traces of a given seismic record may be successively correlated, one with another, so as to make apparent for each of such pairs of traces, the lag expressed in time units of the reflections of the two traces of said pair with respect to each other.

In order to carry out this method, there may be used two similar transparent films on which the same group of $n$ traces is recorded in variable density and/or variable area. The two films are superposed and shifted with respect to one another by the width of one or more traces. By displacing one of these films with respect to the other in front of a light source and measuring, at each time during this displacement, the light quantity passing through the two superposed films into each channel corresponding to a separate pair of traces, there is obtained a series of values representative of the function of correlation between the traces of each of the pairs on said records.

It is an object of this invention to carry out such an optical correlation method.

It is another object of this invention to provide a device performing the successive operations required for carrying out said correlation method in a rapid and simple manner.

These and other objects as may be apparent from the following specification and claims are achieved by the device according to this invention which comprises optical means for correlating by pairs the record traces of the same seismic shot, said traces being recorded respectively on two transparent supports which are superposed, means for longitudinally displacing one of said transparent supports with respect to the other, optical means for selecting on said superposed supports a pair of traces which are intended to be correlated with each other, said last mentioned optical means being displaceable along the direction of the width of said transparent superposed supports, means for measuring the correlation between the two traces of said pair in the form of an electrical value of variable magnitude as a function of time, optical recording means adapted for recording said variable electrical value, representative of the correlation function, on a sensitive support longitudinally displaceable with respect to said recording means, gear means interrelating, according to a predetermined relation, the longitudinal displacement of said sensitive support with the relative displacement of the transparent supports, and means associating to the displacement of said optical selecting means a synchronous displacement of the recording means with respect to the sensitive support along the direction of the width of the latter.

The optical means for correlating the traces comprises for instance two lenses placed on both sides of the two transparent supports having recorded thereon the various traces relative to a single seismic shot.

The means for selecting on the superposed supports the pair of traces which are intended to be correlated with each other comprise a sliding diaphragm or moving window interposed between the two lenses.

A light source lights the transparent supports through one of the lenses, and the measurement of the correlation is carried out by means of a photoelectric cell receiving the convergent light beam from the other lens and converting the quantity of light that it receives, which varies with the longitudinal displacement of one of the supports relative to the other, to an electric current of variable intensity which is representative of the correlation function. The longitudinal displacement of one of the supports with respect to the other is obtained by driving means such as for instance sprocket wheels driven by a motor.

The optical means for recording the correlation function as represented by the varying electric current produced by the photoelectric cell, essentially comprises in combination a further light source and a mirror galvanometer whose mirror inclination varies in accordance with the current intensity supplied to the galvanometer by the photoelectric cell.

The sensitive support on which said correlation function is recorded is impressed by the spot of the galvanometer, while being displaced with respect to the latter in a movement bound to the relative movement of the transparent supports having the traces recorded thereon, with respect to each other.

The slidable diapragm or moving window interposed between the two lenses is so selected and adjusted as to give free way only to a light beam of the width of a trace and of a predetermined length.

This diaphragm is so designed as to be slidable into a guide block along the direction of the width of the transparent supports.

A step by step motion of said diaphragm, after each correlation operation on the two traces of one pair, causes the light beam to pass through the following pair of traces. To the diaphragm motion is associated a simultaneous step by step lateral motion of the means for recording the correlation function, each step of which corresponds to the width of a trace so that the various correlation functions corresponding to the successive pairs of traces correlated with each other are recorded in successive order on the sensitive support along the direction of the width thereof.

The present invention will be further illustrated in detail with reference to the accompanying drawing showing a schematic perspective view of one embodiment of the device according to this invention given by way of non-limitative example.

The various elements of the device as shown in this drawing are carried on a common solid frame 35. On two transparent films 1 and 2 provided with lateral perforations there is impressed, in variable density and/or area, the same seismic record comprising $n$ traces. One of these films, film 2 on the figure for instance, remains stationary whereas the other, i.e. film 1 on the figure, is displaced longitudinally along the first one.

This moving film is displaced by means of a motor 3, actuating through the intermediary of two endless screws 4 and of two gear wheels 5, the sprocket driving members 6 which in turn drive the film 1 by means of the film's lateral perforations 7. A light source 8 provides a divergent light beam which passes successively through a first lens 9 converting the same to a parallel beam and through the superposed transparent films 1 and 2. After passage through the films, only one part of the parallel beam passes through the window 10 of a diaphragm 11 supported by a guide block and slidable between the guides 12 thereof. The width of the diaphragm window 10 is equal to that of one of the record traces and its length may be adjusted at will. The part of the beam allowed to pass through the diaphragm window 10 passes thereafter through a second lens 13 converting the same to a convergent beam which sensitizes a photoelectric cell 14, this optical system having the effect of producing on the cell 14 an image of the light source 8.

During the relative displacement of the transparent films with respect to one another the amount of light passing through the diaphragm and sensitizing the photoelectric cell 14 varies and accordingly the photoelectric cell 14 supplies a current of variable intensity, which after amplification through an amplifier 15 actuates the galvanometer 16.

A further light source 17 provides a light beam which, after a first reflection by the mirror 18 is again reflected by the revolving mirror of the galvanometer 16 on the photographic plate 19.

This photographic plate 19 is supported by a driving block and slidable between the slide rails 20 thereof. The plate 19 is longitudinally displaced by means of a screw-threaded shank or endless screw 21 integral with a nut 22 driven in rotation by the motor 3 through the intermediary of a gear box 23 and a clutch 24.

The longitudinal respective displacements of the plate 19 on the one hand and of the moving transparent film 1 on the other hand are simultaneous, since they are both driven at the same time by the motor 3.

Accordingly, during the displacement of the film 1 with respect to the film 2, i.e. during the correlation period, the correlation function is recorded in the form of a curve generated on the plate 19 with the axis of the abscissa along the length thereof, by the spot of the galvanometer 16.

The gear box 23 provides means of selecting at will the time scale on the axis of the abscissa of the plate 19 and the feeding speed of the film 1, so as to determine the relationship between their respective longitudinal displacements. The clutch 24 at the output of the gear box is provided in order to make possible, before the beginning of the operation, the preliminary adjustment in position of the film 1 in accordance with the position of the plate 19.

The galvanometer 16 is so placed that the first correlation function is recorded close to one of the edges of the plate.

When the correlation between the two traces of a first pair has been recorded, the motor 3, by reverse operation, brings back to their starting position the film 1 and the photographic plate 19. This operation is carried out automatically and controlled by a perforation counter 25 which, after passage in front thereof of a predetermined number of perforations of the moving film corresponding to the length of the trace on which it is desired to carry out the correlation, releases, through the intermediary of a control box 26, the forward or reverse operation of the motor 3.

At the moment when this operation is achieved or simultaneously therewith, a motor 27 actuates, through the intermediary of a screw-threaded shank 29 and a nut 28, the diaphragm 11 which slides between the guides 12. The movement of the diaphragm 11 is stopped when its displacement corresponds to the width of a record trace. At this moment, its position is convenient for a new correlation operation on another pair of traces. During this movement and simultaneously therewith, a motor 30 synchronized with the motor 27, drives through the intermediary of a screw-threaded shank 31 and of a nut 32, the casing 33 of the galvanometer 16, said casing being supported by means of a guide block slidable along slide bars 34. The motor 30 is stopped simultaneously with the motor 27, i.e. at the moment when the casing of the galvanometer has been displaced by a distance corresponding to the width of a record trace so that the spot of the galvanometer is again in position for recording the next correlation function on the photographic plate at a distance from the preceding one corresponding to the width of a trace.

During this displacement of the casing 33 of the galvanometer, the light source 17 is switched off or the spot of the galvanometer 16 is deflected so as to prevent any recording on the plate 19.

By realizing a concomitance of movements between the correlation means and the means for recording the correlation functions during each correlation operation on the one hand, and during the step of passing from one correlation operation to the next, on the other hand, the device according to the invention provides means for rapidly reading a series of records.

When the correlations by pairs of the traces of a seismic record of $n$ traces on each of the two films is completed, there are recorded $n$ correlation functions on the photographic plate 19. At this moment, this plate is replaced by an unexposed plate and the two films 1 and 2 are shifted by the required length for carrying out new correlation operations.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed as this invention is:

1. A device for correlating by pairs the record traces of the same seismic shot which have been recorded on two transparent supports, said device comprising a pair of superposed transparent record-carrying supports, optical correlation means, means for longitudinally displacing one of said transparent supports with respect to the other, optical means for selecting on said superposed supports a pair of traces which are to be correlated with each other, said last-mentioned optical means being displaceable along the direction of the width of said transparent superposed supports, means for measuring the correlation between the two traces of said pair in the form of an electrical value of variable magnitude as a function of time, optical recording means adapted for recording said variable electrical value representative of the correlation function between said two traces, on a sensitive support longitudinally displaceable with respect to said recording means, gearing interrelating, according to a predetermined relation, the longitudinal displacement of said sensitive support with the relative displacement of the transparent supports, and means responsive to the displacement of said optical selecting means for effecting a corresponding synchronous displacement of the recording means with respect to the sensitive support along the direction of the width of the latter.

2. A device for correlating by pairs record traces of the same seismic shot which have been recorded on two transparent films, said device comprising a pair of superposed transparent record-carrying films which are displaced laterally with respect to each other by a distance corresponding to the width of at least one trace, comprising in combination a source of light and a photoelectric cell placed on opposite sides of the superposed portions of the films, a lens between said source of light and said films, another lens between the films and said photoelectric cell, a diaphragm interposed between said films and one of said lenses, means for longitudinally displacing one of the transparent films with respect to the other, means for displacing the diaphragm along the direction of the width of the films, a sensitive support for recording purposes displaceable along guiding means in a movement synchronized with the movement of the film in the direction of its length, means for recording on said support the variations of the electric current produced by the photoelectric cell as a function of the displacement of the moving film, and means responsive to the displacement of the diaphragm for displacing said recording means with respect to said sensitive support along the direction of the width of the latter.

3. A device according to claim 2 wherein the moving film is driven by means of sprocket driving members having teeth engaging into the lateral perforations of the film, said sprocket driving members being in turn driven through the intermediary of gear means, by a motor simultaneously actuating the sensitive support through the intermediary of an endless screw.

4. A device according to claim 2 wherein said recording means comprise a casing displaceable along the direction of the width of the sensitive support, a light source and a mirror galvanometer receiving the current produced by the photoelectric cell, after amplification thereof.

5. A device according to claim 2 wherein said sensitive support consists of a photographic plate, and its displacement along the guides supporting the same is controlled by the motor which already drives the moving film, through the intermediary of a gear box, a clutch and an endless screw.

References Cited by the Examiner
UNITED STATES PATENTS

| | | | |
|---|---|---|---|
| 2,839,149 | 6/1958 | Piety | 343—100.7 |
| 3,184,679 | 5/1965 | Kuehne | 343—100.7 |

BENJAMIN A. BORCHELT, *Primary Examiner.*

R. M. SKOLNIK, *Assistant Examiner.*